United States Patent [19]

Memeger, Jr.

[11] 4,226,949
[45] Oct. 7, 1980

[54] WHOLLY AROMATIC POLYAMIDE FOAM

[75] Inventor: Wesley Memeger, Jr., Wilmington, Del.

[73] Assignee: E. I. Du Pont de Nemours and Company, Wilmington, Del.

[21] Appl. No.: 62,907

[22] Filed: Aug. 1, 1979

Related U.S. Application Data

[63] Continuation-in-part of Ser. No. 881,731, Feb. 27, 1978, Pat. No. 4,178,419.

[51] Int. Cl.$^2$ .............................................. C08J 9/02
[52] U.S. Cl. .................................... 521/184; 521/77; 528/347; 528/348
[58] Field of Search .................................. 521/77, 184

[56] References Cited

U.S. PATENT DOCUMENTS 3,770,669  11/1973  Reske et al. ............................. 521/77

*Primary Examiner*—Morton Foelak

[57] ABSTRACT

Aromatic polyamide foams having a density of 0.025 to 0.7 g./cm.$^3$ are prepared by heating N-alkyl aromatic polyamides having at least one $\beta$ hydrogen atom on the alkyl groups, a plasticizer and an aromatic sulfonic acid catalyst at 250° to 340° C. for a length of time sufficient to remove substantially all of the N-alkyl groups.

4 Claims, No Drawings

WHOLLY AROMATIC POLYAMIDE FOAM

RELATED APPLICATION

This application is a continuation-in part of application Ser. No. 881,731 filed Feb. 27, 1978, now U.S. Pat. No. 4,178419 issued Dec. 11, 1979.

BACKGROUND OF THE INVENTION

This invention relates to rigid aromatic polyamide (aramid) foams and a process for their preparation.

Aromatic polyamides are known to have many desirable properties such as good resistance to oxidation at high temperature, a high melting point, low flammability, high stiffness and low sensitivity to solvents. Foam materials are known to be useful as thermal insulators and aramid foams suggest themselves for this use but the high melting points and low solubility of the aromatic polyamides makes fabrication of such foams difficult.

U.S. Pat. No. 3,770,669 discloses one approach to the preparation of polyamide foams. According to this patent polyamides are prepared from N,N'-dialkyl diamines and dicarboxylic acids or dicarbonyl chlorides. The resulting N,N'-dialkyl polyamides are heated at temperatures up to 380° C., optionally in the presence of a salt of a strong acid and a weak base, e.g., pyridinium hydrochloride, to give a foam product. An example of an aramid foam is included. However, it has been found that this product is brittle and excessively flammable, apparently because of an insufficiently high molecular weight and incomplete dealkylation, respectively.

Foam materials combining the features of good mechanical strength and resistance to degradation at high temperatures in the presence of air have long been sought after. Such foams are particularly needed in uses where high temperatures are encountered in structures wherein mechanical strength of the foam is required. One such use is in solar collectors for the utilization of solar energy.

BRIEF SUMMARY OF THE INVENTION

This invention provides foam materials having a density of from 0.025 to 0.7 g./cm.$^3$ which combine the features of good mechanical strength, low flammability and resistance to degradation in air at high temperatures.

This invention provides an aromatic polyamide foam having a density of 0.025 to 0.7 g./cm.$^3$ wherein the cell walls are oriented as evidenced by a birefringence of at least 10% of the maximum possible birefringence. This invention also provides an aromatic polyamide foam prepared by dealkylation of an N-alkyl aromatic polyamide having a density of 0.025 to 0.7 g./cm.$^3$ and having substantially no residual N-alkyl groups. Preferably either the diamine residue or the dicarboxylic acid residue is para-oriented, most preferably both the diamine residue and the dicarboxylic acid residue are paraoriented and still most preferably the aromatic polyamide is poly(p-phenylene terephthalamide) and the walls of the cells comprising the foam have texture.

The foams of this invention are prepared by heating a mixture of an N-alkyl aromatic polyamide having at least one β hydrogen atom on the alkyl group and a plasticizer at a temperature of 250 to 340° C. for a time sufficient to remove substantially all of the N-alkyl groups wherein the mixture contains an aromatic sulfonic acid as catalyst. Preferably the heating is for 150 to 300 minutes. Preferably, substantially all the N-alkyl groups are unsymmetrical and contain 4 to 8 carbon atoms. Preferably the plasticizer is o-dichlorobenzene and the catalyst is benzenesulfonic acid. Most preferably, the alkyl groups are sec-butyl. Most preferably the N-alkyl aromatic polyamide is poly(N,N'-di-sec-butyl-p-phenylene terephthalamide).

DETAILED DESCRIPTION OF THE INVENTION

The N-alkyl groups of the aromatic diamines suitable for preparing the starting polyamide should have 2 to 8 carbon atoms and at least one β-hydrogen atom. Alkyl groups having at least 4 carbon atoms and an unsymmetrical structure are preferred since these diamines provide N-alkyl aromatic polyamides having lower melting points and greater solubility than alkyl groups having fewer carbon atoms and/or a symmetrical structure. N,N'-dialkylphenylene-diamines are preferred and N,N'-dialkyl-p-phenylene-diamines are most highly preferred. Suitable N-alkyl groups are ethyl, propyl, isopropyl, butyl, isobutyl, sec-butyl, t-butyl, pentyl, octyl, 1-ethyl-3-methyl-pentyl, 1-methyl-heptyl, cyclohexyl, 1,4-dimethylpentyl, and 1,3-dimethylbutyl. Preferred dicarbonyl chlorides are isophthaloylchloride, terephthaloyl chloride, 2,6-naphthalene dicarbonyl chloride, 4,4'-bibenzoyl chloride, 3,4'-bibenzoyl chloride and substituted derivatives thereof wherein the substituents are inert to the polymerization and foam forming reactions.

The N-alkylated aromatic polyamide starting materials are best prepared by reaction of one or more of the above mentioned N-alkylated aromatic diamines with an aromatic dicarbonyl chloride at high temperature (about 150° C.) in a solvent such as mineral oil, o-dichlorobenzene, 1,2,4-trichlorobenzene, diphenylether, or pyridine. Optionally, a tertiary amine acid acceptor may be used. The N-alkylaromatic polyamides are conveniently isolated by cooling the mixture whereupon the polymer precipitates or by precipitation with a nonsolvent such as hexane. The N-alkyl aromatic polyamides should have an inherent viscosity of at least 0.25. The amount of N-substitution should be sufficient to provide a polymer having a suitable melting point.

The preparation of the foam materials is conveniently carried out starting from a solution or suspension of the N-alkylaromatic polyamide in a suitable solvent such as o-dichlorobenzene. Other suitable solvents are 1,2,4-trichlorobenzene and diphenyl ether. If these solvents are used for the polymerization reaction the polymer need not be isolated.

The catalyst for the dealkylation is an aryl sulfonic acid present in an amount of about 1 to 10% wt. based on the N-alkyl aromatic polyamide. Suitable aryl sulfonic acids are e.g., benzenesulfonic acid, p-toluenesulfonic acid, o-toluenesulfonic acid, m-toluene sulfonic acid, xylene-sulfonic acids, α or β napthalene sulfonic acid etc. Benzenesulfonic acid is preferred.

The mixture of N-alkyl aromatic polyamide, solvent and catalyst is heated while permitting the solvent to distill and then further heated at a temperature of 250° to 340° C. to effect dealkylation and create the foam. In order to avoid degradation of the polymer, the heating should be for as short a time and at as low a temperature as are commensurate with obtaining a substantially dealkylated product. Incompletely dealkylated products are excessively flammable, apparently because of further alkene being split off under conditions of combustion.

It is ordinarily desirable to complete the dealkylation reaction under reduced pressure which also assists in foam formation.

The foams of the present invention have good mechanical strength having a compressive strength of at least 100 lb./in.$^2$ (690 kPa).

The cells of the foam are closed and range in size from a few microns to a few mm. in diameter.

Optionally the foams may contain up to 30% by weight of inert fillers, antioxidants, UV screeners etc. Preferably any fillers used are of low density, so as not to increase the density of the foam.

Tests

Inherent Viscosity

Inherent viscosity ($\eta$inh) is defined by the following equation:

$$\eta\text{inh} = (\ln (\eta\text{rel})/C)$$

wherein ($\eta$rel) represents the relative viscosity and C represents a concentration of 0.5 grams of the polymer in 100 ml. of solvent. The relative viscosity ($\eta$rel) is determined by dividing the flow time in a capillary viscometer of a dilute solution of the polymer by the flow time for the pure solvent. The dilute solutions used herein for determining ($\eta$rel) are of the concentration expressed by (C), above; flow times are determined at 30° C.; the solvent is concentrated sulfuric acid (96–98% $H_2SO_4$).

Limiting Oxygen Index (LOI)

The L.O.I. is the minimum fraction of oxygen in an oxygen/nitrogen mixture required to just support burning of the sample, see Fenimore and Martin, Modern Plastics, 44 (3), 141 (1966).

Mechanical Strength

Compressional strength and modulus are determined by ASTM D-1621-73.

Density

Density is determined by ASTM D-1622.

Melting Point

A melting point of greater than 400° C. indicates substantially complete dealkylation. The melting point can be determined on a hot bar having a temperature gradient. The melting point is taken as the temperature at which the sample sticks to the bar.

Residual N-alkyl Groups

It is frequently possible to follow the dealkylation reaction by infrared spectroscopy noting loss of absorption at 3.35$\mu$ (2960 cm$^{-1}$). When substantially all of the N-alkyl groups have been removed there is substantially no absorption peak at this frequency and the dealkylated polymer has a melting point and LOI at least as high as that of the underlying polymer.

Orientation in Cell Walls

In this test it is assumed that one knows the birefringence of a highly oriented fiber made of the polymer that comprises the foam being investigated. Cell walls of the foams of this invention have either axial orientation (molecules aligned in one direction) in which the birefringence in the plane of the wall is at least 10% of maximum, or planar orientation (all molecules parallel to a plane) in which the birefringence perpendicular to the plane of the wall is at least 10% of maximum. The test may be performed by the following or equivalent steps.

(1) Remove a cell wall from the sample using a razor blade and tweezers. Place it on a microscope slide (2) Using an interference microscope, find the wall thickness at the point to be investigated.
 [Hale, A. J. The Interference Microscope in Biological Research E & S Livingstone. Ltd. Edinburgh, 1958. (Page 77)]

(3) Using the wall thickness from (2) find the birefringence in the plane of the wall using a ¼ wave plate or other compensator
 [Hallimond, A. F. The Polarizing Microscope (3rd edition) Vickers Ltd. York 1970. (Page 70)]

(4) If the birefringence in (3) is less than 10% of maximum find the birefringence perpendicular to the plane of the wall by using a universal stage and tilting techniques.
 [Same reference as (3) (Page 187, see also Hartshorm, N. H. and Stuart, A. Crystals and the Polarizing Microscope, Edw. Arnold Ltd., London 1960 p. 406.]

Texture

When the cell wall is observed between crossed polars in a microscope, if no position can be found where the wall extinguishes (goes black) uniformly, the cell wall has texture.

EXAMPLE 1

To 75 ml of o-dichlorobenzene is added 22.0 g (0.1 mol) N,N'-di-sec-butyl-p-phenylene diamine (N,N'-D-s-BuPPD) and 20.3 g (0.1 mol) terephthaloyl chloride (TCl). The clear raction mixture is heated at reflux under $N_2$ purge for 8 days. The mixture containing poly(N,N'-di-sec-butyl-p-phenylene terephthalamide) (N,N'-D-S-BuPPD-T) is allowed to cool to the point where it can be poured without boiling. Half of the mixture is transferred to a polymer tube to which an $N_2$ capillary and receiver with vacuum line are connected. Benzene sulfonic acid (technical grade 90%), 0.44 g (2.4% by weight) is added and is heated under $N_2$ in vapor baths at the following temperatures and pressures for the times shown: 220° C./$N_2$ purge/5.3 h; 259° C./$N_2$ purge/1.5 h; 259° C./380 mm Hg (51 KPa)/17 h. During the heating the solvent is mostly distilled at 222° C. and the foam began to form at 259° C. The tube is allowed to cool to room temperature and is broken to remove the foam. The yield is 12 g. This corresponds to quantitative conversion of the N,N'D-s-BuPPD-T to poly(p-phenylene terephthalamide) (PPD-T) based on using about half of the initial reaction mixture in the foaming stage. The infrared spectrum of the foam is identical to that of PPD-T from p-phenylene diamine and terephthaloyl chloride. The density of the foam is about 0.1 g/cm$^3$. The limiting oxygen index is 0.36. Again, this is consistent with the PPD-T structure. A similar foam was prepared at atmospheric pressure.

EXAMPLE 2

Preparation of N,N'-D-s-BuPPD-T

N,N'-D-s-BuPPD is distilled twice through an 18 in-1 in inside diameter punched column. The boiling point is 123° C. at 0.6 mm. Hg. TCl was recrystallized from hexane.

Procedure

To 1800 ml o-dichlorobenzene in 3 liter 3 necked round bottom flask is added 440 g (2 mol) N,N'-D-S-BuPPD (98.8% pure by gas chromatography) and 406 g (2 mol) TCl. The reaction is heated to reflux during which time a clear yellow solution is formed at 100° C. The reaction is heated under reflux for 12 days then cooled to room temperature. The solidified mass is washed 3 times with hexane in a Waring blender using a total of 3.5 gal of hexane. The polyamide is removed by filtration on a sintered glass Buchner funnel. The filter cake is dried in a 90° C. vacuum oven. Yield-725 g (103%)* $\eta_{inh}$—0.40 ($H_2SO_4$).

*Excess wt probably due to residual o-dichlorobenzene

Foam Preparation

To a 2 liter resin kettle fitted with a Claisen head and mechanical stirrer (glass shaft with Teflon ® fluorocarbon stirrer blade) is added 500 ml o-dichlorobenzene, 250 g N,N'-D-s-BuPPD-T, $\eta$inh ($H_2SO_4$)—0.40 and 5.4 g benzenesulfonic acid (2.1% by weight) (90% tech. grade - Aldrich). The kettle is heated with stirring in a Woods metal bath at 200° C. under $N_2$ for 20 minutes when a homogeneous solution is obtained. The solution is heated for 20 minutes more at 200° C. and then the temperature is raised to 220° C. and the o-dichlorobenzene begins to distill. After 150 minutes at 220° C., the temperature is raised to 255° C. and held there for 35 minutes. The viscous yellow melt containing 60 ml. of the initial solvent is poured into a 2.5 cm deep 20×20 cm square "Pyrex" dish. The melt solidifies immediately. The dish containing the solid is placed in a Berringer vacuum oven and is heated as follows under 275 mm Hg. vacuum: 20 minutes/270° C.; 110 minutes/310° C.; and 30 minutes/337° C. The vacuum is released and the dish containing the foam removed. The foam has average dimensions of 20×20×2.5 cm a weight of 150 g and a density of 0.15 g/cm³ (9.35 lb/ft³).

A similar foam is prepared in similar fashion except only 25 ml of o-dichlorobenzene was left in melt. The foam had the following properties.

| | |
|---|---|
| Compressive Strength (10% compression) | 1.0 MPa (150 lbs/in²) |
| Compressive Modulus | 32 MPa (4700 lbs/in²) |
| Limiting Oxygen Index | 0.30 |
| Density | 0.16 g/cm³ (10 lb/ft³) | birefringence, 0.04, 0.04, 0.06, - 10%, 10%, 15% max. The cell walls have texture.

EXAMPLE 3

Poly(N,N'-di-sec-butyl-p-phenylene isophthalamide) (N,N'-D-s-BuPPD-I) Preparation To 1800 ml o-dichlorobenzene is added 440 g (2 mol) N,N'-D-s-BuPPD and 406 g (2 mol) isophthaloyl chloride (ICl). The mixture is heated to reflux and the clear solution held under reflux for 7 days. Upon cooling, the mixture remained a clear yellow solution. A small amount of polymer was isolated by coagulation with hexane. $\eta_{inh}$ ($H_2SO_4$)=0.3

Foam Preparation

To 1085 g of the above solution is added 5.4 g benzenesulfonic acid (90% technical grade) and the solution transferred to a 2 liter 3 necked round bottom flask equipped with an $N_2$ bleed, a mechanical stirrer ("Teflon" stir blade) and a Claisen head with a condenser and a Dean Stark trap. The mixture is heated with an electric heating mantle to reflux and 550 ml. of o-dichlorobenzene is distilled off. The viscous melt is poured into a 20×20×5 cm pyrex dish where it solidifies. The dish is transferred to a Berringer oven and heated as follows:

| Time | Oven Temp. °C. | Pressure ($N_2$ atm) |
|---|---|---|
| 25 min | 210 | 275 mm (37 KPa) |
| 115 min | 310 | " |
| 30 min | 337 | " |

Yield—150 g of foam. The infrared spectrum shows only a trace of N-alkyl groups remaining. The limiting oxygen index is 0.31. The compressive strength is 1.7 MPa (240 lbs./in.²) and the compressive modulus 34 MPa (4960 lbs./in.²).

EXAMPLE 4

Preparation of poly(m-phenylene isophthalamide) (MPD-I) Containing About 32% N-Isobutyl Groups To a 1 liter resin kettle with a shear disc stirrer and $N_2$ bleed is added 200 ml of N,N-dimethylformamide (DMF), 20.5 g (0.20 mol) triethyl amine and 14.3 g (0.1 mol) of m-phenylene diamine containing N-isobutyl groups on 32% of the nitrogen atoms (determinted by NMR). The mixture is cooled with stirring to 0° C. in an ice bath. To the clear solution is added 20.3 g(0.10 mol) of isophthaloyl chloride. The mixture becomes cloudy immediately. The mixture is stirred at 0° C. for 5.5 hours and then allowed to warm to room tempearture during the next hour. Water (275 ml) is added and a curdy precipitate forms. The polymer is removed by filtration. The filter cake is washed with water, air dried on the filter and then dried at 90° C. in a vacuum oven. Yield 26.5 g (97% of theoretical). The $\eta_{inh}$ is 0.26 in concentrated $H_2So_4$. The polymer melts on a hot bar at 240° C.

Preparation of MPD-I Foam

To a polymer tube equipped with an $N_2$ capillary, a receiver and a vacuum line is added 2.5 g of the above poly(m-phenylene isophthamide) containing N-isobutyl groups, on 32% of the amide nitrogen atoms, 0.1 g of benzenesulfonic acid (90% technical grade) and 14 ml o-dichlorobenzene. The polymer tube with $N_2$ flowing through capillary is then heated in a 222° C. vapor bath for 105 minutes during which time vigorous distillation of the o-dichlorobenzene occurs. The melt is then heated in a 283° C. vapor bath for 145 minutes at a pressure of 380 mm Hg (51 KPa). At this point 0.1 g further benzene sulfonic acid is added and the system heated in a 305° C. vapor bath for 20 minutes at a pressure of 380 mm Hg (51 KPa). The system is heated still further for 120 minutes at 305° C. at a pressure of less than 1 mm Hg (133 Pa). During heating under these conditions the material foams and sets up to a solid. Upon cooling under $N_2$ and breaking the polymer tube 1.6 g of a tough foam is obtained. The thin cell walls near the top of the sample are flexible. The foam does not melt at temperatures up to 400° C. (hot bar) and is self extinguishing.

An attempt was made to prepare a similar foam as above except by heating at 380° C. for 30 minutes without added benzenesulfonic acid catalyst. A dark brown melt giving off orange vapors was formed. The product was a brittle cellular material with an oily substance on the surface. The foam melted at 270° C. and had appreciable N-alkyl groups remaining as indicated by infrared spectroscopy. The foam could be ignited in air but was self extinguishing.

I claim:

1. A wholly aromatic polyamide foam prepared by dealkylation of an N-alkyl wholly aromatic polyamide wherein either the diamine residue or the dicarboxylic acid residue is para oriented, said foam having a density of 0.025 to 0.7 g./cm.$^3$ wherein the cell walls are oriented as evidenced by a birefringence of at least 10% of the maximum possible birefringence and having substantially no residual N-alkyl groups.

2. The foam of claim 1 wherein both the diamine residue and the dicarboxylic acid residue are para-oriented.

3. The foam of claim 2 wherein the aromatic polyamide is poly(p-phenylene terephthalamide).

4. The foam of claim 3 wherein the walls of the cells comprising the foam have texture.

* * * * *